United States Patent [19]

Lazzari

[11] Patent Number: 4,911,967
[45] Date of Patent: Mar. 27, 1990

[54] SUBSTRATE FOR MAGNETIC DISK MEMORY AND PRODUCTION PROCESS

[75] Inventor: Jean-Pierre Lazzari, Corenc, France

[73] Assignee: Commissariat a l'Energie Atomique, Paris, France

[21] Appl. No.: 151,981

[22] Filed: Feb. 3, 1988

[30] Foreign Application Priority Data

Feb. 11, 1986 [FR] France .................. 87 01706

[51] Int. Cl.⁴ .................................. G11B 5/64
[52] U.S. Cl. ........................... 428/64; 360/135; 428/167; 428/457; 428/694; 428/900
[58] Field of Search ........... 428/694, 900, 167, 457, 428/461, 64, 65; 360/135

[56] References Cited

U.S. PATENT DOCUMENTS 3,290,692 12/1966 Jacoby .................................. 360/135
4,673,602 6/1987 Nakayama et al. .................. 428/65
4,698,251 10/1987 Fukuda et al. ....................... 360/135

FOREIGN PATENT DOCUMENTS 54-18125 7/1979 Japan .................................... 428/65

Primary Examiner—Paul J. Thibodeau
Attorney, Agent, or Firm—Oblon, Spivak, McClelland, Maier & Neustadt

[57] ABSTRACT

Substrate for magnetic disk memory and production process.

The substrate comprises an aluminium wafer (10) and two plastic sheets (39,41) pressed hot against the wafer. The outer faces (38,40) have a good flatness or smoothness, as a result of the surface state of the pressing plates.

Application to the production of substrates used in the manufacture of disks for magnetic recording purposes.

1 Claim, 1 Drawing Sheet

U.S. Patent   Mar. 27, 1990   4,911,967
FIG. 1
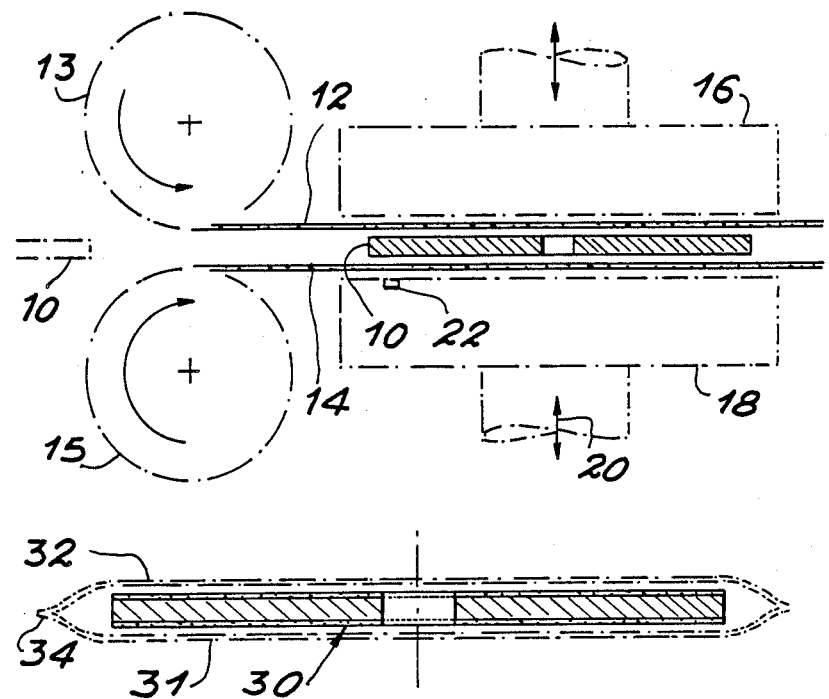
FIG. 2
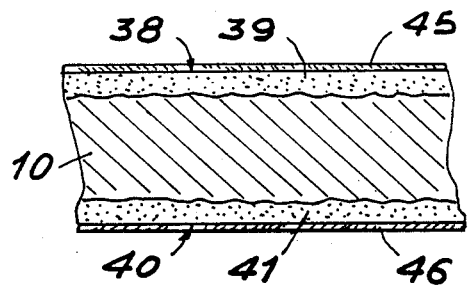
FIG. 3
FIG. 4
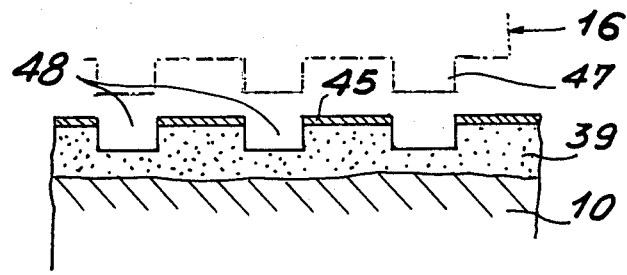

SUBSTRATE FOR MAGNETIC DISK MEMORY AND PRODUCTION PROCESS

The present invention relates to a substrate for a magnetic disk memory and to a process for producing this substrate.

A disk memory for mass storage comprises a magnetic layer in which are recorded binary informations, generally in the form of a magnetization direction. A reading head passes above the disk at a distance of approximately 0.5 $\mu$m and reads the magnetic informations contained in the layer.

The substrate on which the magnetic layer is deposited must have a certain number of characteristics, i.e. it must be inexpensive, light (must accept accelerations and decelerations in rapid rotation), be flat and smooth and have an excellent surface state.

The prior art substrates are obtained by cutting a wafer from an aluminium sheet giving a disk with a central hole. This crude wafer is then faced and polished.

A nickel-phosphorous coating is deposited by electrolysis, because aluminium is difficult to polish. The nickel-phosphorous coating is then repolished in order to achieve a flatness or smoothness of approximately $\pm 5$ $\mu$m and a suitable surface state. A substrate with nickel-phosphorous is described e.g. in Japanese patent application 59-124025 of R. Hikita, published on July 18, 1984.

This procedure suffers from disadvantages, particularly in that it leads to a high price, largely due to the polishing operations.

In certain cases, after polishing the surface of the disk, using diamond powder circular microgrooves or microscratches with a depth of 0.50 nm are made, which prevent the travelling member from sticking to the surface of the disk. However this operation only increases further the cost of the substrate.

Another important disadvantage results from the use of these substrates. When coated with the thin magnetic film constituting the information support, aluminium defects (inclusions, impurities, etc), diffuse through the nickel-phosphorous coating into the magnetic film, thus creating irreparable defects.

Another procedure has recently been described in EP-O-152 329. It consists of using a metal disk covered with an organic coating, on which is deposited a thin hard film of a silica or hydrated silicate-based material. Although satisfactory in certain respects, this procedure remains difficult to perform.

U.S. Pat. No. 3 290 692 discloses disks or drums covered with a prestressed vinyl or synthetic resin sheet. However, in this case, the flatness state is dependent on the sheet used and the sheetdisk contact is not always satisfactory.

Finally, Japanese patent abstract, vol. 8, no. 38 of 18.2.1984 and corresponding to JP-A-58 189 836 discloses an aluminium disk covered with a thermosetting resin. The disadvantages of this solution are the same as those of the process described in US-A-3 290 692.

The present invention proposes a new substrate for disk memories not suffering from the disadvantages referred to hereinbefore.

More specifically, the present invention relates to a substrate for a magnetic disk memory, comprising an aluminium wafer covered on at least one of its faces by an organic material sheet adhering to the aluminim wafer, said sheet offering a smooth outer surface for receiving a magnetic recording layer, said substrate being characterized in that the sheet is made from plastic and is hot pressed onto the wafer.

The invention also relates to a process for producing such a substrate. According to this process, a wafer is produced with the aid of an aluminium sheet and on at least one face of said wafer is deposited a sheet of organic material. This process is characterized in that, for depositing the organic material sheet, a plastic material sheet is pressed hot onto the wafer with the aid of at least one plate having the requisite surface state.

Preferably, the plate has circular reliefs, which make grooves in the plastic sheet.

In such a process, it is the flatness or smoothness of the pressing plates, which will define the flatness or smoothness of the ultimately obtained disk. Moreover, it will be possible to obtain particular reliefs. These advantages are not encountered in the prior art.

The invention is described in greater detail hereinafter relative to non-limitative embodiments and the attached drawings, wherein show:

FIG. 1 an installation making it possible to produce a substrate according to the invention.

FIG. 2 in section, a substrate in a protective envelope.

FIG. 3 in section, a detail of the substrate.

FIG. 4 the configuration of microgrooves formed in the outer face of the substrate.

FIG. 1 shows an aluminium wafer 10, which has only been faced following removal from the lathe and not polished. This wafer is placed between two plastic sheets 12,14, respectively supplied by rollers 13,15. Plates 16,18 are located on either side of the wafer and are connected to a press 20. Optical sensors 22, e.g. at 120° from one another, make it possible to centre disk 10 relative to the plates.

The plastic sheets are e.g. of polycarbonate, nylon, KAPTON ®, polyimide, etc., or have an organic composition adapted to a good adhesion on the substrate.

Plates 16 and 18 have parallel pressing surfaces, which ensures an excellent parallelism between the faces of the substrate once they have been pressed, no matter what the parallelism of the aluminium wafer faces.

In order to ensure a good adhesion of the plastic sheets, the wafer can be coated beforehand with a resin, prior to the application and pressing of the plastic sheets. This coating can be obtained by impregnating the wafer in an adhesive solution. Plates 16 and 18 can also have centering rods, which hold the wafer during the moving together of the plates.

When the plates are still pressed against the aluminium wafer, the plastic sheets are peripherally cut and in the centre of the wafer. It is preferable to carry out this operation when the outer surfaces of the substrate are protected, in order to eliminate any risk of pollution by particles. After pressing, the plates 16 and 18 move apart, thereby freeing the disk.

It is preferable not to integrally cut the plastic sheets, so that a link is left between the disks. The latter are then interconnected by a plastic garland. This link is then easily broken when it is wished to manipulate a substrate.

In order to protect the substrate as soon as it is made, it is possible to place it between two protective plastic sheets 31,32 immediately following pressing, as shown in FIG. 2 and to hot weld these sheets along their periphery 34. Thus, a tight protective envelope is obtained and the substrate 30 is located inside it.

FIG. 3 shows in greater detail the result obtained after pressing. The outer surfaces 38,40 of the pressed sheets 39,41 have an excellent surface state and this is obtained without mechanical polishing. Thus, wafer 10 can have a mediocre surface state (the roughnesses have been exaggerated in FIG. 3), because it is enveloped by plastic sheets. The wafer faces no longer require a very high degree of cleanness, because any particles carried by these faces would be trapped between the plastic sheets and the aluminium wafer.

With the substrate according to the invention, the magnetic films 45,46 which will form the recording support and which are shown in FIG. 3 are separated from the aluminium wafer, which avoids ionic contaminations, as referred to hereinbefore in connection with the prior art.

The invention also makes it possible to very simply produce grooves or scratches in the outer surface of the substrate. For example, in order to bringabout a good separation of the recording tracks, which has the advantage of reducing crosstalk, plates 16 and 18 can have circular reliefs 47, as illustrated in FIG. 4. During pressing, these reliefs are transferred into the plastic sheets, where they form grooves 48. The magnetic film 48 then only remains between these grooves in order to form circular tracks. The grooves 48 constitute intertrack areas, which are embedded in the plastic. These areas are at a greater distance from the reading head than that which would be obtained with a uniform face, so that they produce a weaker interfering signal.

Another advantage of the invention is that it solves the problem of heads sticking. As stated hereinbefore, when the surface of the disk is perfectly planar, the blocks supporting the writing and reading heads stick to the disk. The conventional solution to this problem consisted of artificially making microscratches with the aid of fine brushes. The invention makes it possible to obtain these in a much more simple way, namely directly during the pressing operation. It is merely necessary to use plates having microreliefs obtained by an appropriate machining operation.

In order to have very clean pressing surfaces, it is appropriate to regularly clean the plates either between each pressing operation, or at the end of a certain number of pressing operations. Two sets of plates per face can be used. Whilst one of the sets is in use for pressing, the other is being cleaned. Any known cleaning method can be used, including cleaning by oxygen plasma, in order to eliminate organic compounds.

I claim:

1. A magnetic disk memory comprising a substrate having at least one major surface and a magnetic layer deposited on said major surface, said substrate comprising an aluminum wafer covered on said major surface by an organic plastic sheet hot pressed onto the wafer, and offering a smooth outer surface on which said magnetic layer is formed, said sheet, after pressing, bearing grooves.

* * * * *